US012331870B2

(12) United States Patent
Rosén et al.

(10) Patent No.: US 12,331,870 B2
(45) Date of Patent: Jun. 17, 2025

(54) METHOD FOR FILLING A TRENCH COMPRISING A PAIR OF CONDUITS AND SUCH A FILLED TRENCH

(71) Applicant: E.ON SVERIGE AB, Malmö (SE)

(72) Inventors: Per Rosén, Lund (SE); Jacob Skogström, Lomma (SE); Bengt Lindoff, Bjärred (SE); Fredrik Rosenqvist, Helsingborg (SE)

(73) Assignee: E.ON SVERIGE AB, Malmö (SE)

( * ) Notice: Subject to any disclaimer, the term of this patent is extended or adjusted under 35 U.S.C. 154(b) by 1099 days.

(21) Appl. No.: 17/251,000

(22) PCT Filed: Oct. 14, 2019

(86) PCT No.: PCT/EP2019/077754
§ 371 (c)(1),
(2) Date: Nov. 1, 2022

(87) PCT Pub. No.: WO2020/078891
PCT Pub. Date: Apr. 23, 2020

(65) Prior Publication Data
US 2022/0356672 A1    Nov. 10, 2022

(30) Foreign Application Priority Data
Oct. 15, 2018 (EP) ..................................... 18200378

(51) Int. Cl.
*F16L 59/15* (2006.01)
*E02F 5/22* (2006.01)
(Continued)

(52) U.S. Cl.
CPC .............. *F16L 59/15* (2013.01); *E02F 5/223* (2013.01); *F16L 1/028* (2013.01); *F16L 59/04* (2013.01)

(58) Field of Classification Search
CPC . F16L 1/028; F16L 59/04; F16L 59/15; E02F 5/223
(Continued)

(56) References Cited

U.S. PATENT DOCUMENTS 3,650,119 A    3/1972 Sparling
3,655,564 A *  4/1972 Barrington .............. F16L 59/15
                                                      252/62

(Continued)

FOREIGN PATENT DOCUMENTS

CN    206608621    11/2017
DE    2717489 A1 * 10/1978
(Continued)

OTHER PUBLICATIONS

International Search Report and Written Opinion of PCT/EP2019/077754, dated Dec. 19, 2019, in 12 pages.

*Primary Examiner* — Frederick L Lagman
(74) *Attorney, Agent, or Firm* — Knobbe, Martens, Olson & Bear, LLP

(57) ABSTRACT

A filled trench is disclosed. The filled trench comprises: a pair of conduits (3a, 3b) for delivering fluid with a different temperature in each of the conduits (3a, 3b), the pair of conduits (3a, 3b) being surrounded by filling material; a first section (5a) filled with a filling material of a first type (4a), wherein the first filled section (5a) of the filled trench occupies a space in between the pair of conduits (3a, 3b); and a second section (5b) filled with a filling material of a second type (4b). The filling material of the first type (4a) has a first thermal conduction coefficient and the filling material of a second type (4b) has a higher second thermal conduction coefficient. Further, a method for filling such a filled trench is disclosed.

16 Claims, 4 Drawing Sheets

(51) Int. Cl.
*F16L 1/028* (2006.01)
*F16L 59/04* (2006.01)

(58) Field of Classification Search
USPC .............................................. 405/157, 184.5
See application file for complete search history.

(56) References Cited

U.S. PATENT DOCUMENTS

| | | | |
|---|---|---|---|
| 3,675,432 A * | 7/1972 | Keene | ..................... F16L 59/12 |
| | | | 405/157 |
| 3,933,181 A | 1/1976 | Nilsson et al. | |
| 4,219,050 A | 8/1980 | Hargrave et al. | |
| 7,581,903 B1 * | 9/2009 | Scola | ..................... C04B 28/02 |
| | | | 405/157 |

FOREIGN PATENT DOCUMENTS

| | | |
|---|---|---|
| DE | 3112175 | 10/1982 |
| DE | 3345553 | 7/1985 |
| DE | 29618888 | 12/1996 |
| EP | 1319898 | 6/2003 |
| JP | S49-21748 A | 2/1974 |
| JP | H02-203032 A | 8/1990 |
| NL | 7413570 | 4/1975 |
| RU | 2642084 C1 * | 1/2018 |

\* cited by examiner

METHOD FOR FILLING A TRENCH COMPRISING A PAIR OF CONDUITS AND SUCH A FILLED TRENCH

TECHNICAL FIELD

The present disclosure relates to a method for filling a trench comprising a pair of conduits and such a filled trench.

BACKGROUND ART

District heating systems are systems for distributing heat to a number of places remote from where the heat is generated. Generally, the systems consist of a central heat generating location with conduits distributing a heated heat transfer medium, most commonly water, to a number of locations in order to transfer heat from the heated heat transfer medium to the locations. The heat transfer medium is distributed by pressurizing it. The conduits are arranged in pairs with an outgoing conduit supplied with the heated heat transfer medium and a returning conduit returning the heat transfer medium after use. The heated heat transfer medium is utilized at each remote location by taking heated heat transfer medium from the outgoing conduit and then returning it to the returning conduit.

In order to simplify the construction of the system the pair of conduits are parallel arranged next to each other. Often the pair of conduits are buried underground in order to isolate them from the outside world as well as to isolate the outside world from the conduits since they carry pressurized heated heat transfer medium. To do this a trench is dug in the ground and each of the two conduits are placed in the trench which is then filled. The conduits are placed at a distance from each other such that they are not in contact with each other. The trench is filled with a material which is chosen such that the axial thermal forces of the conduits can be absorbed by the filling material. This is done by choosing the filling material such that the friction between the conduits and the filling material is enough to absorb the axial thermal forces.

One of the largest problems in district heating systems is the loss of heat of the system. Especially losses as the system transports the heated heat transfer medium over long distances. In order to reduce the heat losses, the conduits are insulated. This is done either by directly covering and surrounding the conduits with insulation or by arranging the conduits in an insulating box. Also the outgoing conduit and the returning conduit may affect each other which may increases the loss of heat from the outgoing line. There is a continued need for district heating systems where heat losses are reduced.

In addition to district heating systems there are also district cooling systems. These systems work in a similar manner but distribute cooled heat transfer medium rather than heated heat transfer medium. Generally, district cooling systems cool a heat transfer medium at a central location and distribute the cooled heat transfer medium to remote locations through conduits. As in district heating the heat transfer medium is distributed by pressurizing it. The conduits are arranged in pairs with an outgoing conduit supplied with the cooled heat transfer medium and a returning conduit returning the heat transfer medium after use. The cooled heat transfer medium is utilized at each remote location by taking the cooled heat transfer medium from the outgoing conduit and then returning it to the returning conduit. Conduits for district cooling systems are arranged in a similar manner as conduits for district heating systems.

For district cooling systems one of the largest problems is the gain of heat of the system. Especially gains as the system transports the cooled heat transfer medium over long distances. In order to reduce the heat gains the conduits are insulated. This is done either by directly covering and surrounding the conduits with insulation or by arranging the conduits in an insulating box. Also the outgoing conduit and the returning conduit may affect each other which may increases the gain of heat of the outgoing line. There is a continued need for district heating systems where heat losses gains are reduced.

Often district heating and district cooling conduits are placed next to each other. A problem in these cases is that the conduits of the district heating system and the conduits of the district cooling system may affect each other. This is a problem for both of the systems.

In addition to district heating systems and district cooling systems a district thermal energy distribution system as defined in WO 2017076868 A1 is presently developed. In this system a hot conduit and a cold conduit is used for distributing both heat and cold in the same district thermal energy distribution system. A problem for this system is that the hot conduit and the cold conduit may affect each other.

SUMMARY

It is an object of the invention to provide for a system for distributing heated and/or cooled heat transfer medium with reduced loss and/or gain of temperature.

According to a first aspect a filled trench is provided. The filled trench comprising a pair of conduits for delivering fluid with a different temperature in each conduit, the pair of conduits being surrounded by filling material; a first section filled with a particulate filling material of a first type, wherein the first filled section of the filled trench occupies a space in between the pair of conduits; and a second section filled with a particulate filling material of a second type; wherein the filling material of the first type has a first thermal conduction coefficient and the filling material of a second type has a second thermal conduction coefficient.

By such a filled trench it is possible to thermally insulate the conduits from each other by the filling material itself. An outgoing conduit of a district heating or district cooling system may be better insulated from the returning conduit of the same district heating or district cooling system and vice versa. Also, a conduit of a district heating system may be insulated from a conduit of a district cooling system and vice versa. Also conduits of the district thermal energy distribution system as described in WO2017076868 A1 may be insulated from each other. This since the first section occupies a space between the conduits and has a different thermal conduction coefficient relative the second section filled with the filling material of the second type. This may then make it possible to construct a system for distributing heat transfer medium with reduced gain or loss of temperature.

Further, another possible advantage with the present filled trench is that finding leaks in the conduits may be easier. This since the leaking fluid is leaking from the "naked" conduit directly into the filling material. When dealing with conduits comprising an insulation layer or conduits being insulated in an insulating box fluid leaking out from the conduit may be transported from the place of the leak and thereafter leak out to the filling material.

Moreover, repairing the "naked" conduits may also be made easier. This since no insulation need to be peeled off before repairing the leak and thereafter the insulation layer need to be repaired as well.

The first thermal conduction coefficient may be smaller than the second thermal conduction coefficient. This may enhance the thermal insulation between the pair of conduits even better.

The first section and the second section may be horizontally separated from each other, as seen in a vertical cross sectional side view of the filled trench. By this it is possible to provide a trench where different portions of the trench, which are arranged horizontally next to each other, may be insulated from each other.

The first section and the second section may be vertically separated from each other, as seen in a vertical cross sectional side view of the filled trench. By this it is possible to provide a trench where different portions of the trench, which are arranged vertically next to each other, may be insulated from each other. Also this allows for a trench which is simple to fill since the trench can be filled by first adding one of the sections and then adding the other section on top.

The first section may surround one of the conduits of the pair of conduits. By this, one of the conduits may be insulated from all its surroundings by the filling material and the thermal interaction between the conduit and its surroundings may be controlled.

The second section may at least partly surround the other conduit of the pair of conduits. By this the thermal interaction between the other conduit and its surroundings may be controlled.

The second section may surround the other conduit of the pair of conduits. By this the thermal interaction of the other conduit and its surroundings may be even better controlled.

The conduits of the pair of conduits may be parallel arranged, as seen in a horizontal cross sectional top view of the filled trench. By this the conduits may easily be arranged in the trench and the trench may extend for long distances. Also the distance between the conduits may kept constant which allows for better control of the filling of the trench. This also allows for better control of the insulation of the conduits from each other, by the filling material. It is understood that the pair of conduits does not need to be parallel arranged throughout all their extension.

The conduits of the pair of conduits may be horizontally, vertically, or both horizontally and vertically separated from each other, as seen in a vertical cross sectional side view of the filled trench. By this different set ups of the conduits are allowed for. By having them horizontally separated it is possible to easily access one of the conduits without having to make contact or access or interfere with the other. Also this makes it possible to not have the conduits vertically separated which would allow for a trench which has a smaller depth. By having them vertically separated it is possible to easily surround the conduits with different filling material. This by first adding a filling material around the lower conduit and then adding another filling material on top, around the uppermost conduit. Also this makes it possible to not have the conduits horizontally separated which would allow for a trench which has a smaller width. By having the conduits both horizontally and vertically separated it is possible to combine the above effects and advantages. It would also allow for a trench which is both narrower and shallower as the conduits may be closer to each other in both a horizontal and vertical direction, instead being separated in a diagonal direction.

The first section may be centrally arranged in the trench, and the second section may be flanking the first section. By this it is possible to utilize the insulating effect of the first section to insulate the conduits from each other while utilizing another effect of the second section. For example, the second section may be of a cheaper material, or it may provide better structural qualities, or it may be that it provides for a better insulation towards the environment surrounding the trench or it may be that it provides an increased interaction, for example thermal interaction, with the environment surrounding the trench. An increased thermal interaction with the environment surrounding the trench may allow for storing heat or cold in the environment surrounding the trench.

The trench may comprise a third section arranged as a cover of the trench. By this the trench may be protected by from the top which may be the part of the trench which is in contact with the aboveground world.

The pair of conduits may be formed by plastic tubing. By this the conduits may be cheap, durable or both. Since the filling material in the trench may provide insulation the plastic tubing may not need to be provided with extra insulation.

According to a second aspect a method for filling a trench comprising a pair of conduits for delivering fluid with a different temperature in each conduit is provided. The method comprising: filling the trench with filling material such that the pair of conduits are surrounded by the filling material. The act of filling comprises: filling the trench with filling material of a first type such that a first filled section of the trench is formed, wherein the first filled section of the trench is occupying a space in between the pair of conduits; and filling the trench with filling material of a second type such that a second filled section of the trench is formed. The filling material of the first type has a first thermal conduction coefficient and the filling material of the second type has a second thermal conduction coefficient. The first thermal conduction coefficient may be smaller than the second thermal conduction coefficient.

By such a method it is possible to construct a trench where the conduits are thermally insulated from each other by the filling material itself. This may then make it possible to construct a system for distributing heated or cooled heat transfer medium with reduced gain or loss of temperature.

The method may further comprise forming the trench by removing material from ground. By this the method may provide for that a trench is formed in the ground in a simple manner, which trench then may be filled. Further, this may provide for that the conduits are arranged underground.

The method may further comprise arranging the conduits of the pair of conduits parallel to each other in the trench, as seen in a horizontal cross sectional top view of the filled trench. By arranging the conduits in this manner the trench may extend for long distances. Also the distance between the conduits is kept constant which allows for better control of the filling of the trench. This also allows for better control of the insulation of the conduits from each other, by the filling material.

The above mentioned features of the filled trench, when applicable, apply to this second aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures showing embodiments. The figures should not be considered limiting to the specific embodiment; instead they are used for explaining and understanding.

As illustrated in the figures, the sizes of layers and regions may be exaggerated for illustrative purposes and, thus, are provided to illustrate the general structures of embodiments. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
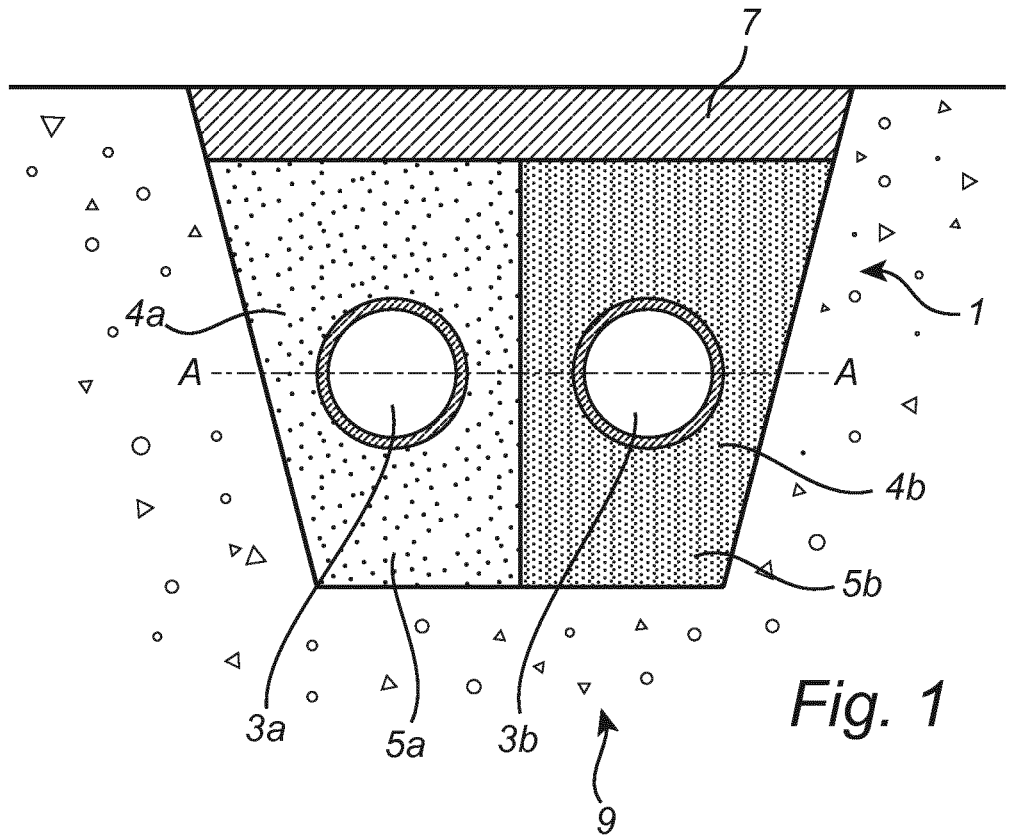
FIG. 1 is a vertical cross sectional side view of a filled trench comprising a pair of conduits.

In FIG. 1 a vertical cross sectional side view of a filled trench 1 comprising a pair of conduits 3a, 3b is shown. The trench 1 is formed in the ground 9. The trench 1 is filled with filling material 4a, 4b. The conduits 3a, 3b are configured to carry a heat transfer medium. The conduits 3a, 3b are typically carrying heat transfer medium of different temperature. The conduits 3a, 3b may be the conduits of a district heating system. The conduits 3a, 3b may be the conduits of a district cooling system. The conduits 3a, 3b may be one conduit of a district heating system and one conduit of a district cooling system. The conduits 3a, 3b may be the hot and cold conduits of the district thermal energy distribution system presented in WO 2017076868 A1. The filling material 4a, 4b surrounds the pair of conduits 3a, 3b. Preferably, the filling material 4a, 4b completely surrounds the pair of conduits 3a, 3b. Hence, the pair of conduits 3a, 3b are circumferentially surrounded by the filling material 4a, 4b on all sides thereof as seen in the vertical cross sectional side view of a filled trench 1.

The trench 1 comprises a first section 5a and a second section 5b. The first section 5a occupies a space between the pair of conduits 3a, 3b. The first section 5a is filled with a filling material of a first type 4a. The second section 5b is filled with a filling material of a second type 4b. The filling material of the first type 4a and the filling material of the second type 4b may be particle materials or particulate material. Hence, the filling material used for filling the trench may be a material consisting of particles. The size of the particles may be in the range from 0.1 millimeters to 5 centimeters, preferably in the mm range. The filling material of a first type 4a has a first thermal conduction coefficient. The filling material of a second type 4b has a second thermal conduction coefficient. The first thermal conduction coefficient may be smaller than the second thermal conduction coefficient. The first section 5a may thus thermally insulate the pair of conduits 3a, 3b from each other.

A today common filling material for trenches comprising conduits is moist sand. Moist sand has a thermal conduction coefficient in the range of 0.58 and 1.75 W/mK. Hence approximately 1 W/mK.

The filling material of the first section may be of a material which has a thermal conduction coefficient which is lower than that of moist sand. Hence, the thermal conduction coefficient of the filling material of the first type may be lower than 1 W/mK, preferably lower than 0.58 W/mK. For example, the thermal conduction coefficient of the filling material of the first type may be 0.3 W/mK or lower. According to a non-limiting example, the filling material of the first type may comprise coal. The thermal conduction coefficient of coal is between 0.26 and 0.63 W/mK. According to another non-limiting example, the filling material of the first type may comprise peat. The filling material of the first type may be a mixture of different materials. The filling material of the first type may comprise moist sand.

The filling material of the second section may be of a material which has a thermal conduction coefficient which is higher than that of moist sand. Hence, the thermal conduction coefficient of the filling material of the second type may be higher than 1 W/mK, preferably higher than 1.75 W/mK. For example, the thermal conduction coefficient of the filling material of the second type may be 3.5 W/mK or higher. According to a non-limiting example, the filling material of the second type comprises salt. The thermal conduction coefficient of salt is between 5.28 and 6.38 W/mK. According to another non-limiting example, the filling material of the second type may comprise quartzite. The thermal conduction coefficient of quartzite is between 3.60 and 6.62 W/mK. The filling material of the second type may be a mixture of different materials. The filling material of the second type may comprise moist sand.

The trench 1 may comprise a third section 7 arranged as a cover of the trench 1. The third section may be filled with a filling material of a third type. The filling material of a third type may have a thermal conduction coefficient different from the thermal conduction coefficients of the first and second types of filling material. The third section 7 may e.g. correspond to a roadway with thereto associated roadbed and surface layer.

Figure 2:
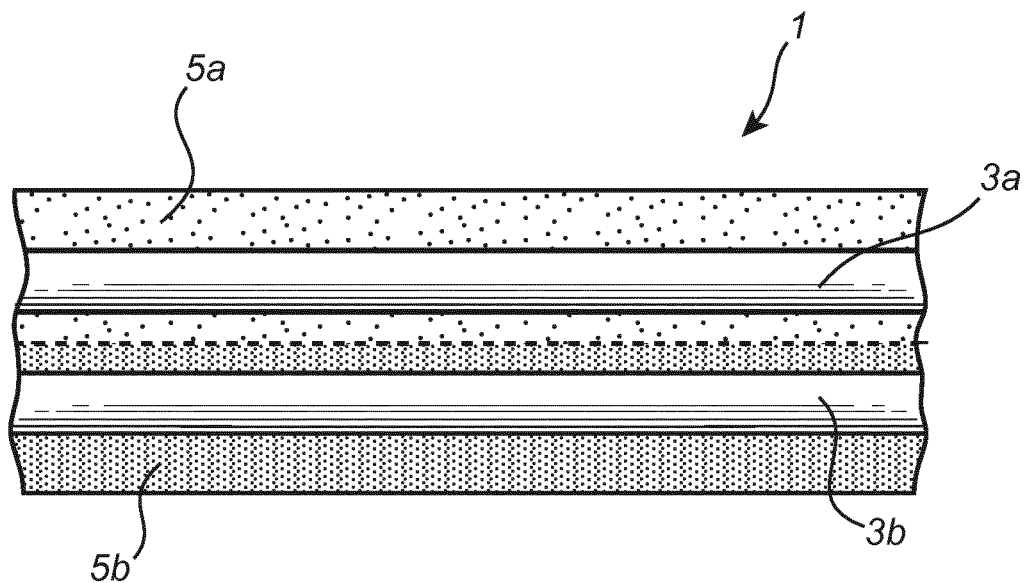
FIG. 2 is a horizontal cross sectional top view of a filled trench comprising a pair of conduits.

In FIG. 2 horizontal cross section along A-A in FIG. 1 of a part of the trench 1 is shown. As illustrated, the conduits 3a, 3b may be parallel arranged in the trench 1. The pair of conduits 3a, 3b extend along the trench 1.

Figure 3A:
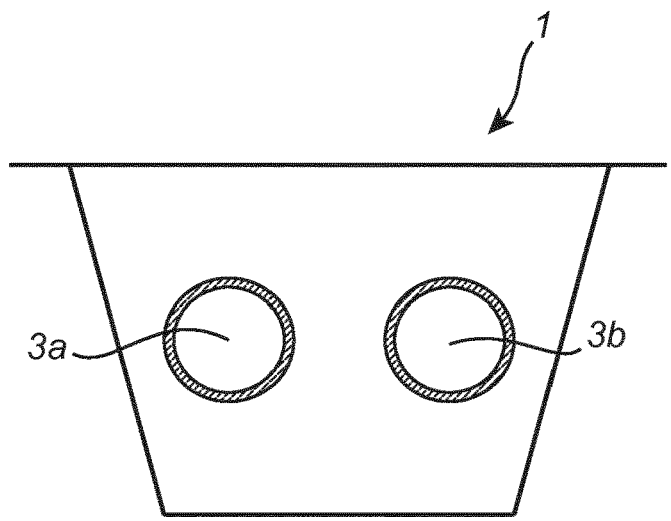
FIGS. 3a-c are a vertical cross sectional side views of trenches showing different positions of a pair of conduits within the respective trench.
Figure 3B:
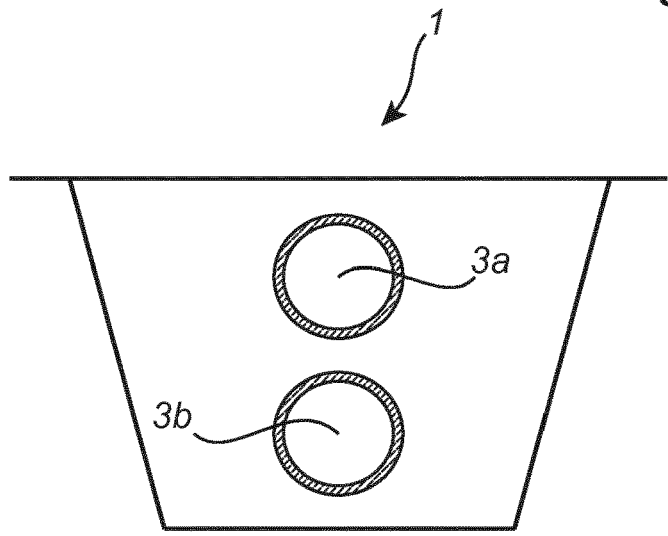
Figure 3C:
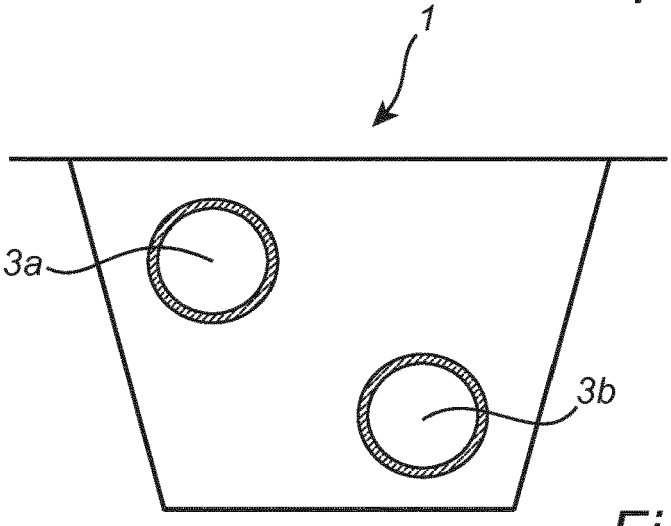

In FIGS. 3a-c, cross sectional side views of a different trenches 1 are illustrated. A pair of conduits 3a, 3b is arranged in each trench 1. The pair of conduits 3a, 3b are shown without any filling material in the trench 1. As illustrated in FIGS. 3a-c the pair of conduits 3a, 3b may be differently oriented within the trench 1. Each of the FIGS. 3a-c is a vertical cross sectional side view of the trench 1 having a different orientation of the pair of conduits 3a, 3b within the trench 1.

Further, as also illustrated in FIGS. 3a-3c the conduits 3a, 3b may be positioned separate from each other. Hence, the conduits 3a, 3b are not contacting each other. Moreover, as mentioned above the conduits 3a, 3b may also be parallel arranged as seen in a longitudinal extension of the conduits 3a, 3b.

As illustrated in FIG. 3a the pair of conduits 3a, 3b may positioned at the same depth of the trench 1. Further, the pair of conduits 3a, 3b may be horizontally separated from each other as seen in the vertical cross sectional side view of the trench 1.

As illustrated in FIG. 3b the pair of conduits 3a, 3b may be positioned at different depth of the trench 1. Further, the pair of conduits 3a, 3b may be vertically separates from each other as seen in the vertical cross sectional side view of the trench 1.

As illustrated in FIG. 3c the pair of conduits 3a, 3b may be positioned both at different depth of the trench 1, i.e. being vertically separated from each other as seen in the vertical cross sectional side view of the trench 1, and being horizontally separated from each other as seen in the vertical cross sectional side view of the trench 1. Hence, the conduits 3a, 3b may be both horizontally and vertically separated from each other as seen in the vertical cross sectional side view of the trench 1.

The conduits 3a, 3b may be formed by plastic tubing. Alternatively, the conduits may be formed by steel pipes.

In FIGS. 4a-f, cross sectional side views of a different trenches 1 are illustrated. The trenches 1 are shown without any pair of conduits of filling material in the trench 1. Instead, FIGS. 4a-f illustrates how different possibilities to divide a trench into sections to be filled with different filling material. For each trench the first section 5a is configured to be filled with the filling material of the first type 4a and the second section 5b is configured to be filled with the filling material of the second type 4b. As illustrated in FIGS. 4a-f the first section 5a and the second section 5b of the trench 1 may de differently arranged within the trench 1. Common for all arrangements of the first section 5a and the second section 5b of the trench 1 is that the first section 5a of the trench 1 is to occupy a space between the pair of conduits 3a, 3b. In FIGS. 5a-f the pair of conduits 3a, 3b has not been illustrated, this in order to better illustrate how the first and second sections 5a, 5b may be related to each other.

The alternative relative orientations of the pair of conduits 3a, 3b shown in FIGS. 3a-c and the relative orientations of the first and second sections 5a, 5b shown in FIGS. 4a-f may be combined in a filled trench 1 in various ways. One or both of the pair of conduits 3a, 3b may be surrounded by the first section. One or both of the pair of conduits 3a, 3b may be arranged between the first section 5a and the second section 5b, being in contact with each of the sections 5a, 5b. One of the pair of conduits 3a, 3b may be surrounded by the second section 5b. Both of the pair of conduits 3a, 3b may be surrounded by the second section 5b, with the first section 5a occupying a space between the pair of conduits 3a, 3b.

Further, common for all the arrangements of the first section 5a and the second section 5b of the trench 1 may be that the filling material of the sections 5a, 5b together completely surround the pair of conduits 3a, 3b. The first and second sections 5a, 5b may be arranged next to each other. The first and second sections 5a, 5b may be in contact with each other. Together, the first and second sections 5a, 5b may completely fill the trench 1.

Figure 4A:
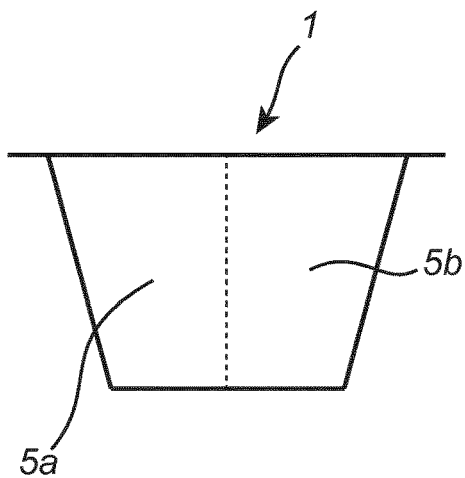
FIGS. 4a-f are vertical cross sectional side views of trenches showing different positions of a first and second section of the respective trench.

As illustrated in FIG. 4a the first and second sections 5a, 5b may be horizontally separated from each other. Each of the first and second section 5a, 5b may occupy a portion of the trench 1 horizontally next to the other.

Figure 4B:
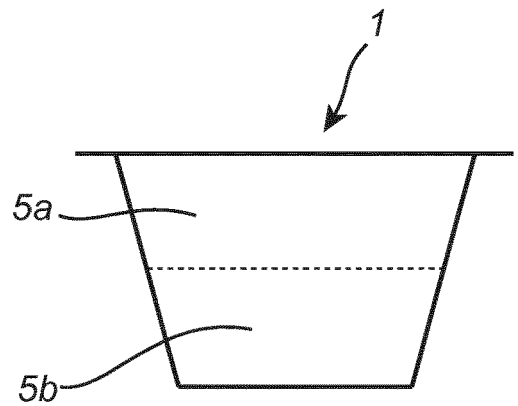

As illustrated in FIG. 4b the first and second sections 5a, 5b may be vertically separated from each other. Each section 5a, 5b may occupy a portion of the trench 1 vertically next to the other.

Figure 4C:
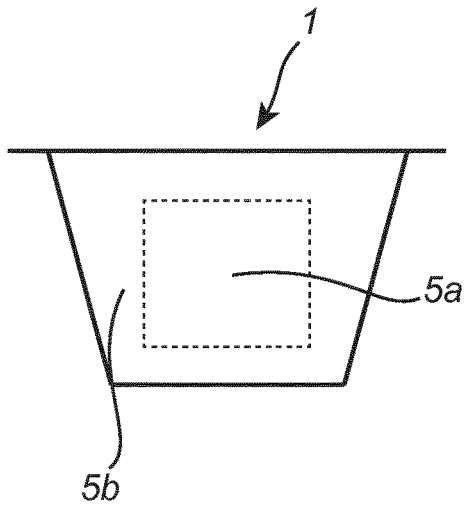

As illustrated in FIG. 4c the first section 5a may be centrally arranged in the trench 1. Further, the second section 5b may be peripherally arranged in the trench 1. The first section 5a may be surrounded by the second section 5b, seen in a vertical cross-section of the trench 1. The first section 5a may be completely surrounded by the second section 5b, seen in a vertical cross-section of the trench 1.

Figure 4D:
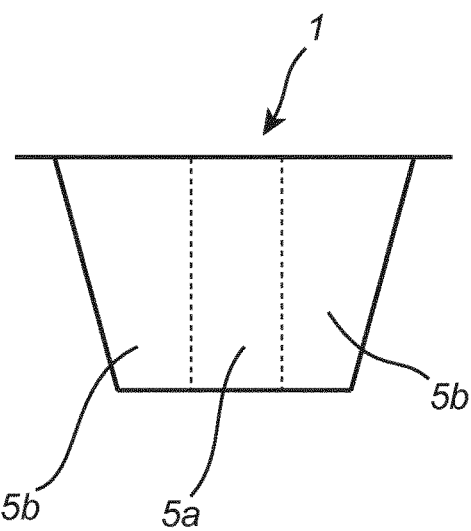

As illustrated in FIG. 4d the first section 5a may be centrally arranged in the trench 1, as seen in the horizontal direction of the vertical cross-section of the trench 1. The first section 5a may further extend vertically through the vertical cross-section of the trench 1. The second section 5b may flank the first portion 5a on two sides thereof. The second section 5b may flank the first portion 5a on two sides thereof, as seen in the horizontal direction of the vertical cross-section of the trench 1. The second portion section 5b may occupy two portions of the trench 1. The second section 5b may occupy a portion of the trench 1 on two sides of the first section 5a.

Figure 4E:
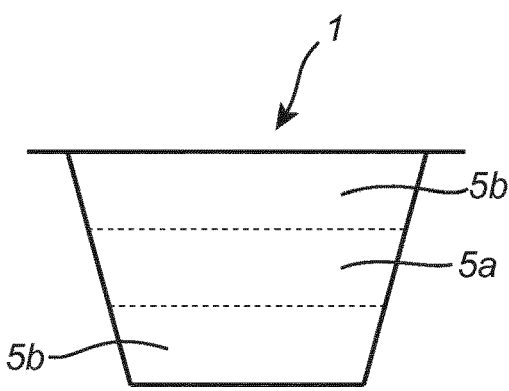

As illustrated in FIG. 4e the first section 5a may centrally arranged in the trench 1, as seen in the vertical direction of the vertical cross-section of the trench 1. The first section 5a may extend horizontally through the vertical cross-section of the trench 1. The second section 5b may flank the first portion 5a on two sides thereof. The second section 5b may flank the first portion 5a on two sides thereof, as seen in the vertical direction of the vertical cross-section of the trench 1. The second portion section 5b may occupy two portions of the trench 1. The second section 5b may occupy a portion of the trench 1 on two sides of the first section 5a.

Figure 4F:
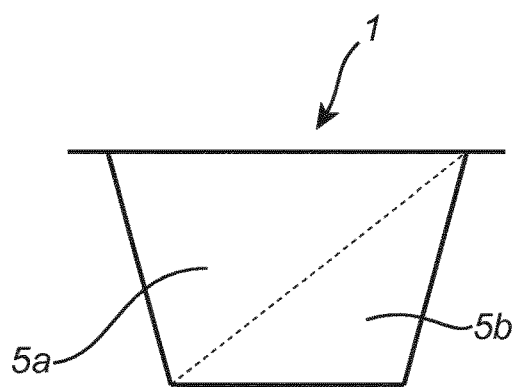

As illustrated in FIG. 4f the first and second sections 5a, 5b may be diagonally arranged with respect to each other, as seen in the vertical cross-section of the trench 1.

Figure 5:
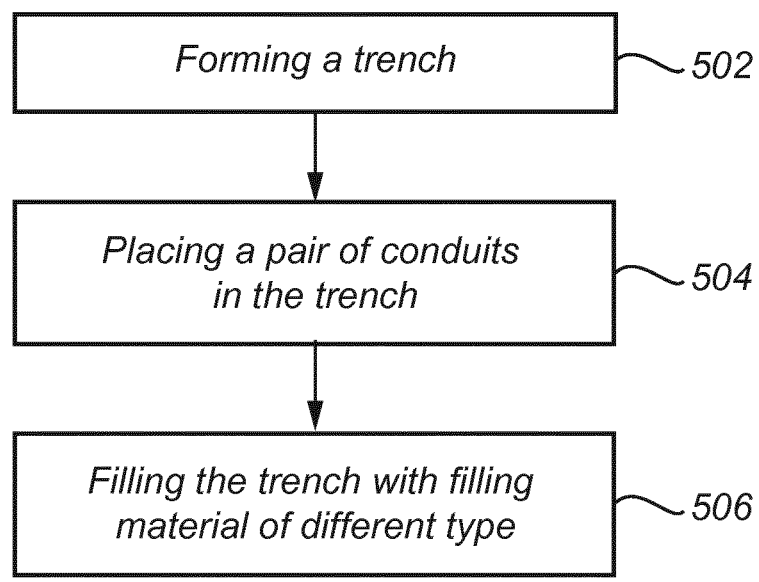
FIG. 5 is a block diagram of a method for filling a trench with filling material.

In connection with FIG. 5 a method for filling a trench comprising a pair of conduits for delivering district heating and/or cooling will now be described.

The method comprising the following acts. Filling S506 a trench with filling material of different types. The filling is done by filling the trench with filling material of the first type and filling material of the second type. The filling with the first type of filling material is made such that a first section of the trench is formed, the first section occupying a space between a pair of conduits located within the trench. The filling with the second type of filling material is made such that a second section of the trench is formed.

The method may further comprise forming S502 the trench by removing material from the ground.

The method may further comprise placing S504 the pair on conduits in the trench.

The method may comprise partly filling the trench with filling material prior to placing the conduits in the trench.

The conduits of the pair of conduits may be placed in the trench one after the other, the method may then include partly filling the trench in between placing each of the conduits of the pair of conduits.

The method may include forming a third section arranged as a cover of the trench. The third section may be formed by filling the trench with a filling material of a third type.

The person skilled in the art realizes that the present invention by no means is limited to the preferred embodiments described above. On the contrary, many modifications and variations are possible within the scope of the appended claims.

For example, the first thermal conduction coefficient may be higher than the second thermal conduction coefficient.

Further, the filling material of the first type 4a may be colored in a first predetermined color. The filling material of the second type 4b may be colored in a second predetermined color. The second predetermined color may be different than the first predetermined color. By coloring the filling materials of the first and second type the existence of the pair of conduits may be easily detected by infrastructure builder digging in the ground close to the pair of conduits. By having different colors for the different types of filling material it may be easy to find a certain type of section in the trench.

Moreover, the method may include placing a spacer wall positioned in the trench and filling the trench at one side of the spacer wall with filling material of the first type and at the other side with filling material of the second type. The spacer wall may then be removed.

Additionally, variations to the disclosed embodiments can be understood and effected by the skilled person in practicing the claimed invention, from a study of the drawings, the disclosure, and the appended claims

The invention claimed is:

1. A filled trench comprising:
    a pair of conduits of one or more thermal energy distribution systems, the pair of conduits being configured to deliver fluid with a different temperature in each of the conduits, the pair of conduits being circumferentially surrounded by particulate filling material on all sides thereof as seen in the vertical cross sectional side view of the filled trench;
    a first section filled with a particulate filling material of a first type, wherein the first filled section of the filled trench occupies a space in between the pair of conduits; and
    a second section filled with a particulate filling material of a second type, wherein both of the pair of conduits are surrounded by the second section;
    wherein the first section separates the second section into two spaced apart portions;
    wherein the filling material of the first type has a first thermal conduction coefficient and the filling material of a second type has a second thermal conduction coefficient, wherein the first thermal conduction coefficient is smaller than the second thermal conduction coefficient; and
    wherein the first section and the second section are horizontally separated from each other, as seen in a vertical cross sectional side view of the filled trench.

2. The filled trench according to claim 1, wherein the thermal conduction coefficient of the particulate filling material of the first type is lower than 1W/mK.

3. The filled trench according to claim 1, wherein the thermal conduction coefficient of the particulate filling material of the first type is lower than 0.58 W/mK.

4. The filled trench according to claim 1, wherein the thermal conduction coefficient of the particulate filling material of the first type is lower than or equal to 0.3 W/mK.

5. The filled trench according to claim 1, wherein the thermal conduction coefficient of the particulate filling material of the second type is higher than 1 W/mK.

6. The filled trench according to claim 1, wherein the thermal conduction coefficient of the particulate filling material of the second type is higher than 1.75 W/mK.

7. The filled trench according to claim 1, wherein the thermal conduction coefficient of the particulate filling material of the second type is higher than or equal to 3.5 W/mK.

8. The filled trench according to claim 1, wherein the first section and the second section are vertically separated from eachother, as seen in a vertical cross sectional side view of the filled trench.

9. The filled trench according to claim 1, wherein the conduits of the pair of conduits are parallel arranged, as seen in a horizontal cross sectional top view of the filled trench.

10. The filled trench according to claim 1, wherein the conduits of the pair of conduits are horizontally, vertically, or both horizontally and vertically separated from each other, as seen in a vertical cross sectional side view of the filled trench.

11. The filled trench according to claim 1, wherein the first section is centrally arranged in the trench, and wherein the second section is flanking the first section on two sides thereof.

12. The filled trench according to claim 1, further comprising a third section arranged as a cover of the filled trench.

13. The filled trench according to claim 1, wherein the pair of conduits are formed by plastic tubing.

14. A method for filling a trench comprising a pair of conduits of one or more thermal energy distribution systems, the pair of conduits being configured to deliver fluid with a different temperature in each conduit, the method comprising:
    filling the trench with particulate filling material such that the pair of conduits are circumferentially surrounded by the particulate filling material on all sides thereof as seen in the vertical cross sectional side view of the filled trench;
    wherein the act of filling comprises:
        filling the trench with particulate filling material of a first type such that a first filled section of the trench is formed, wherein the first filled section of the trench is occupying a space in between the pair of conduits; and
        filling the trench with particulate filling material of a second type such that a second filled section of the trench is formed, wherein both of the pair of conduits are surrounded by the second section;
    wherein the first section separates the second section into two spaced apart portions;
    wherein the filling material of the first type has a first thermal conduction coefficient and the filling material of the second type has a second thermal conduction coefficient, wherein the first thermal conduction coefficient is smaller than the second thermal conduction coefficient; and
    wherein the first section and the second section are horizontally separated from each other, as seen in a vertical cross sectional side view of the filled trench.

15. The method according to claim 14, further comprising forming the trench by removing material from ground.

16. The method according to claim 14, further comprising arranging the conduits of the pair of conduits parallel to each other in the trench, as seen in a horizontal cross sectional top view of the filled trench.

* * * * *